United States Patent
Liu et al.

(10) Patent No.: US 11,127,422 B1
(45) Date of Patent: Sep. 21, 2021

(54) MAGNETIC READ SENSORS AND RELATED METHODS HAVING A REAR HARD BIAS AND NO AFM LAYER

(71) Applicant: Western Digital Technologies, Inc., San Jose, CA (US)

(72) Inventors: Xiaoyong Liu, San Jose, CA (US); Ji Li, Shenzhen (CN); Changhe Shang, Fremont, CA (US); Daniele Mauri, San Jose, CA (US); Yukimasa Okada, Cupertino, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/918,848

(22) Filed: Jul. 1, 2020

(51) Int. Cl.
*G11B 5/39* (2006.01)
*G11B 5/00* (2006.01)

(52) U.S. Cl.
CPC ............ *G11B 5/399* (2013.01); *G11B 5/3912* (2013.01); *G11B 2005/0008* (2013.01)

(58) Field of Classification Search
None
See application file for complete search history.

(56) References Cited

U.S. PATENT DOCUMENTS

| | | | |
|---|---|---|---|
| 5,583,725 A * | 12/1996 | Coffey | B82Y 10/00 360/324.11 |
| 7,436,637 B2 | 10/2008 | Pinarbasi | |
| 7,466,524 B2 * | 12/2008 | Freitag | G11B 5/33 360/324.11 |
| 7,522,391 B2 * | 4/2009 | Freitag | B82Y 25/00 360/324.12 |
| 9,030,785 B2 | 5/2015 | Freitag et al. | |
| 9,053,720 B1 | 6/2015 | Chye et al. | |
| 9,269,382 B1 * | 2/2016 | Bertero | G11B 5/3929 |
| 9,337,414 B2 | 5/2016 | Li et al. | |
| 9,666,214 B1 * | 5/2017 | Bertero | G11B 5/3912 |
| 10,157,634 B2 | 12/2018 | Ding et al. | |
| 2003/0179513 A1 | 9/2003 | Pinarbasi | |

(Continued)

OTHER PUBLICATIONS

Zheng, Y. K., et al., "Side Shielded TMR Reader With Track-Width-Reduction Scheme", IEEE Transactions on Magnetics, vol. 42, No. 10, Oct. 2006, pp. 2303-2305.

(Continued)

*Primary Examiner* — William J Klimowicz
(74) *Attorney, Agent, or Firm* — Patterson & Sheridan, LLP; Steven H. Versteeg

(57) ABSTRACT

Aspects of the present disclosure generally relate to magnetic recording heads of magnetic recording devices. A magnetic read head includes a first pinning layer magnetically oriented in a first direction, and a second pinning layer formed above the first pinning layer and magnetically oriented in a second direction that is opposite of the first direction. The magnetic read head includes a rear hard bias disposed outwardly of one or more of the first pinning layer relative or the second pinning layer. The rear hard bias is magnetically oriented to generate a magnetic field in a bias direction. The bias direction points in the same direction as the first direction or the second direction. The magnetic read head does not include an antiferromagnetic (AFM) layer between a lower shield and an upper shield.

19 Claims, 8 Drawing Sheets

(56) References Cited

U.S. PATENT DOCUMENTS

| | | |
|---|---|---|
| 2003/0179515 A1 | 9/2003 | Pinarbasi |
| 2005/0213265 A1 | 9/2005 | Gill |
| 2007/0076331 A1* | 4/2007 | Pinarbasi ............... B82Y 25/00 360/324.11 |
| 2007/0133133 A1 | 6/2007 | Freitag et al. |

OTHER PUBLICATIONS

Mao, Sining, et al., "Tunneling Magnetoresistive Heads Beyond 150 Gb/in2", IEEE Transactions on Magnetics, vol. 40, No. 1, Jan. 2004, pp. 307-312.

* cited by examiner

MAGNETIC READ SENSORS AND RELATED METHODS HAVING A REAR HARD BIAS AND NO AFM LAYER

BACKGROUND OF THE DISCLOSURE

Field of the Disclosure

Aspects of the present disclosure generally relate to magnetic recording heads of magnetic recording devices, such as magnetic read sensors of magnetic read heads of hard disk drives (HDD).

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track are narrowed. Attempts to achieve increasing requirements of advanced narrow gap reader sensors of read heads to achieve reading of higher recording densities have been proposed However, attempts to increase recording densities involve complexities and costs in forming magnetic sensors, alignment complexities, head instability, thickness limitations, corrosion concerns, shingled magnetic recording (SMR) trimming, and resolution penalties.

As an example, including an antiferromagnetic (AFM) layer in magnetic sensors can involve specialized stitching processes and separate deposition of the AFM layer in certain configurations, and can involve corrosion in certain configurations. Including an AFM layer can also otherwise involve relatively decreased resolutions due to the finite thickness range of the AFM layer required.

Therefore, there is a need in the art for an improved magnetic read head.

SUMMARY OF THE DISCLOSURE

Aspects of the present disclosure generally relate to magnetic recording heads of magnetic recording devices. A magnetic read head includes a first pinning layer magnetically oriented in a first direction, and a second pinning layer formed above the first pinning layer and magnetically oriented in a second direction that is opposite of the first direction. The magnetic read head includes a rear hard bias disposed outwardly of one or more of the first pinning layer relative or the second pinning layer. The rear hard bias is magnetically oriented to generate a magnetic field in a bias direction. The bias direction points in the same direction as the first direction or the second direction. The magnetic read head does not include an antiferromagnetic (AFM) layer between a lower shield and an upper shield.

In one implementation, a magnetic read sensor includes a first pinning layer magnetically oriented in a first direction. The first pinning layer includes an inward end at a media facing surface and an outward end. A second pinning layer is formed above the first pinning layer and magnetically oriented in a second direction that is opposite of the first direction. The second pinning layer includes an inward end at the media facing surface and an outward end. A spacer layer is between the first pinning layer and the second pinning layer. A free layer is formed above the second pinning layer, and the free layer includes an inward end disposed at the media facing surface and an outward end. A barrier layer is between the second pinning layer and the free layer. A rear hard bias is disposed outwardly of the first pinning layer relative to the media facing surface. The rear hard bias is magnetically oriented to generate a magnetic field in a bias direction that points in the same direction as the first direction of the first pinning layer.

In one implementation, a magnetic read sensor includes a first pinning layer magnetically oriented in a first direction. The first pinning layer includes an inward end at a media facing surface and an outward end. A second pinning layer is formed above the first pinning layer and magnetically oriented to in a second direction that is opposite of the first direction. The second pinning layer includes an inward end at the media facing surface and an outward end. A spacer layer is between the first pinning layer and the second pinning layer. A free layer formed above the second pinning layer, and the free layer includes an inward end disposed at the media facing surface and an outward end. A barrier layer is between the second pinning layer and the free layer. A rear hard bias is disposed outwardly of the second pinning layer relative to the media facing surface, and the rear hard bias is magnetically oriented to generate a magnetic field in a bias direction. The bias direction points in the same direction as the second direction of the second pinning layer.

In one implementation, a magnetic read sensor includes a lower shield, and a first pinning layer formed above the lower shield and magnetically oriented in a first direction. The first pinning layer includes an inward end at a media facing surface and an outward end. The magnetic read sensor also includes a second pinning layer formed above the first pinning layer and magnetically oriented in a second direction that is opposite of the first direction. The second pinning layer includes an inward end at the media facing surface and an outward end. The magnetic read sensor also includes a free layer formed above the second pinning layer, and the free layer includes an inward end disposed at the media facing surface and an outward end. The magnetic read sensor also includes an upper shield formed above the free layer, and a first side shield formed on a first side of the first pinning layer, the second pinning layer, and the free layer. The first side shield includes a single material layer structure coupled to the upper shield and separated from the lower shield through an insulation layer. The magnetic read sensor also includes a second side shield formed on a second side of the first pinning layer, the second pinning layer, and the free layer. The second side shield includes a single material layer structure coupled to the upper shield and separated from the lower shield through an insulation layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
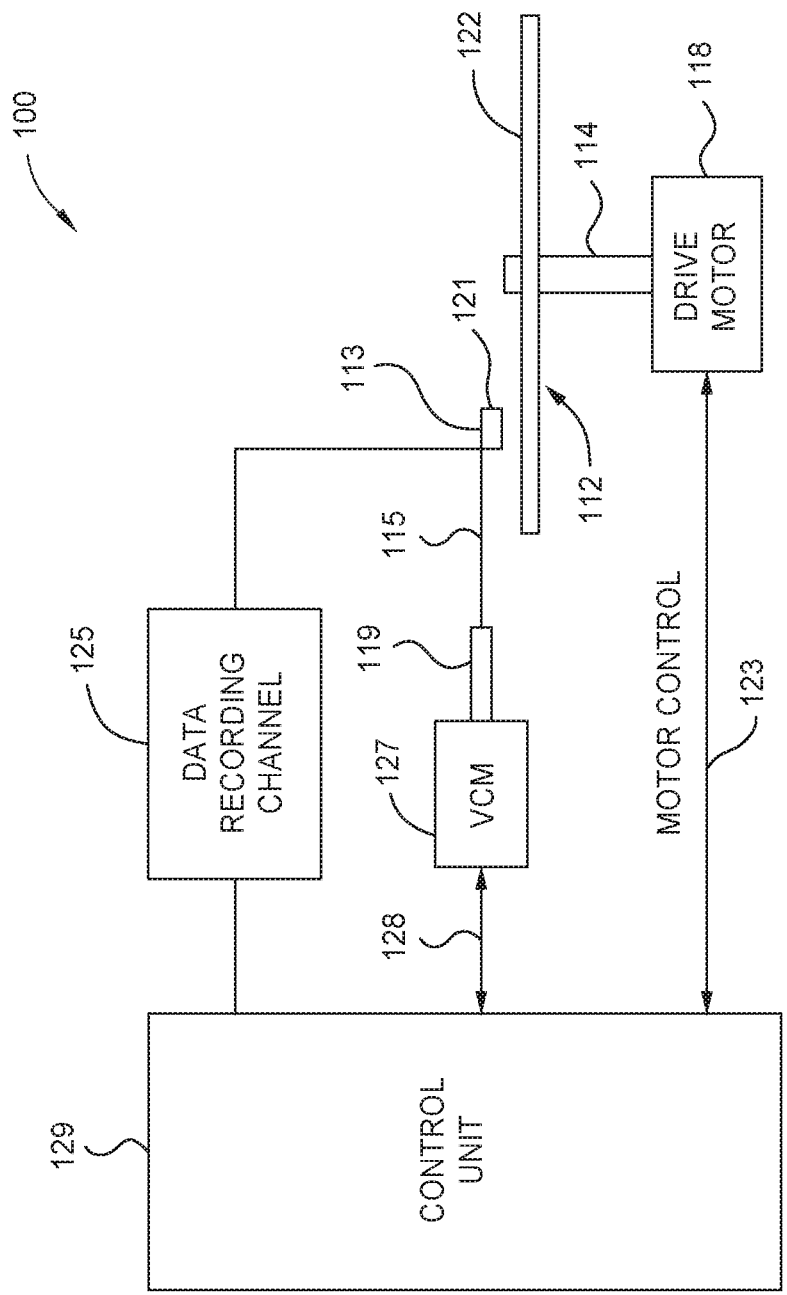
FIG. 1 is a schematic illustration of a magnetic recording device including a magnetic write head and a magnetic read head, according to one implementation.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to magnetic recording heads of magnetic recording devices. A magnetic read head includes a first pinning layer magnetically oriented in a first direction such that a magnetization of the first pinning layer is aligned with the first direction. The first direction is perpendicular to a media facing surface (MFS) and is parallel to a reader stripe height direction. The magnetic read head also includes a second pinning layer formed above the first pinning layer and magnetically oriented in a second direction that is opposite of the first direction. The second pinning layer is magnetically oriented in the second direction such that a magnetization of the second pinning layer is aligned with the second direction. The magnetic read head includes a rear hard bias disposed outwardly of one or more of the first pinning layer relative or the second pinning layer. The rear hard bias is magnetically oriented to generate a magnetic field in a bias direction. The bias direction points in the same direction as the first direction or the second direction. The magnetic read head does not include an antiferromagnetic (AFM) layer between a lower shield and an upper shield.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is also to be understood that aspects disclosed herein, such as the magnetoresistive devices, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors or other spintronic devices.

FIG. 1 is a schematic illustration of a magnetic recording device 100 including a magnetic write head and a magnetic read head, according to one implementation. The magnetic recording device 100 is a magnetic media drive. The magnetic recording device 100 may be a single drive/device or may include multiple drives/devices. The magnetic recording device 100 includes a magnetic recording medium, such as one or more rotatable magnetic disks 112 supported on a spindle 114 and rotated by a drive motor 118. For the ease of illustration, a single disk drive is shown according to one embodiment. The magnetic recording on each magnetic disk 112 is in the form of any suitable patterns of data tracks, such as annular patterns of concentric data tracks on the magnetic disk 112.

At least one slider 113 is positioned near the magnetic disk 112. Each slider 113 supports a head assembly 121 including one or more magnetic recording heads (for example read/write heads), such as a write head and such as a read head including a TMR device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic recording device 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. In one embodiment, which can be combined with other embodiments, the magnetic media drive of FIG. 1 may further include a plurality of media, or disks, a plurality of actuators, and/or a plurality number of sliders.

Figure 2:
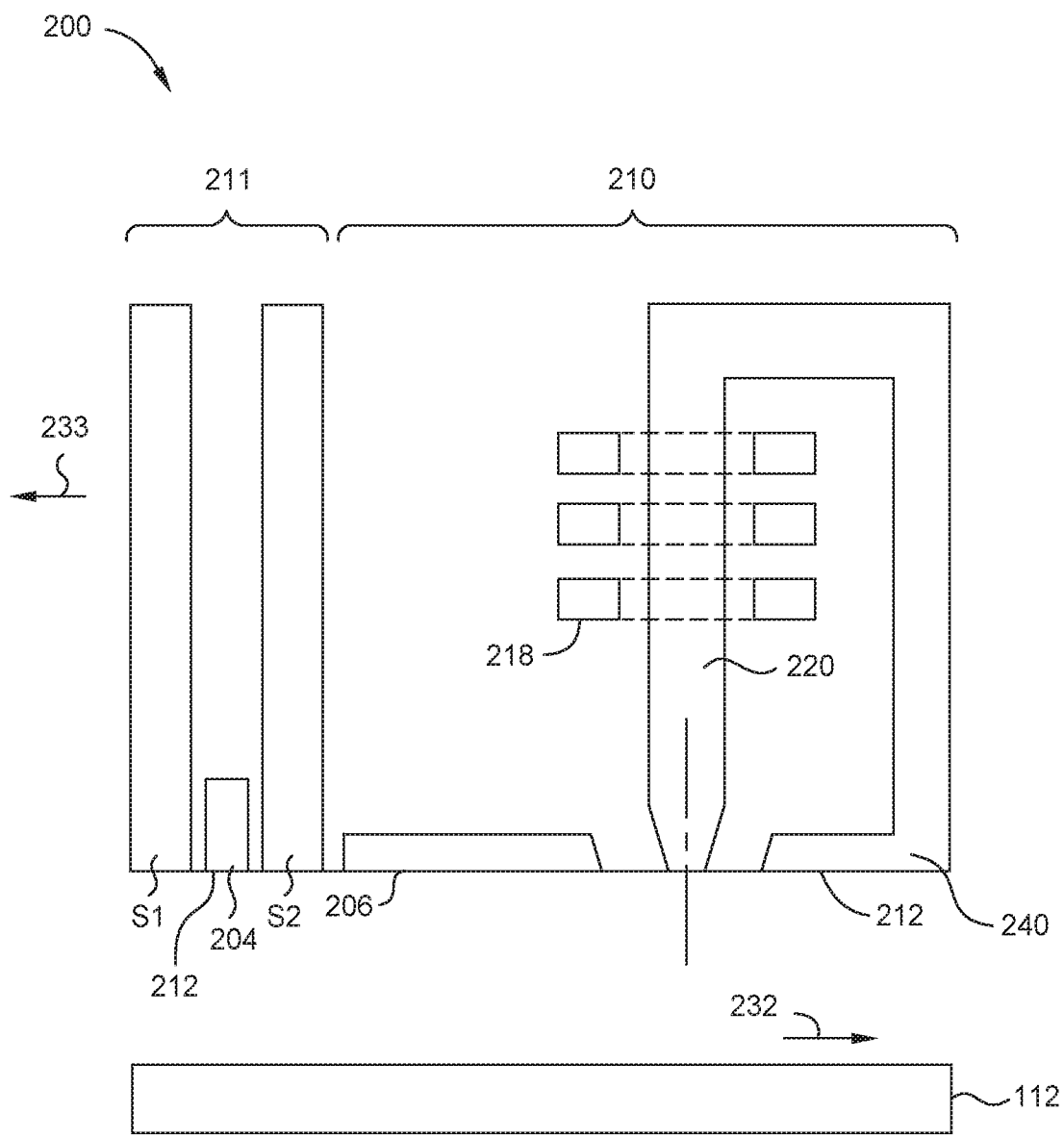
FIG. 2 is a schematic illustration a cross sectional side view of a head assembly facing the magnetic disk or other magnetic storage medium, according to one implementation.

FIG. 2 is a schematic illustration a cross sectional side view of a head assembly 200 facing the magnetic disk 112 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 include a sensing element 204 disposed between shields S1 and S2. The sensing element 204 and the shields S1 and S2 have the MFS 212 facing the magnetic disk 112. The sensing element 204 is a TMR device sensing the magnetic fields of the recorded bits, such as perpendicular recorded bits or longitudinal recorded bits, in the magnetic disk 112 by a TMR effect. In one embodiment, which can be combined with other embodiments, the spacing between shields S1 and S2 is 20 nm or less.

The head assembly 200 includes a write head 210. The write head 210 includes a main pole 220, a leading shield 206, and a trailing shield (TS) 240. The main pole 220 comprises a magnetic material and serves as a main electrode. Each of the main pole 220, the leading shield 206, and the trailing shield (TS) 240 has a front portion at the MFS. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures. The TS 240 includes a magnetic material, serving as a return pole for the main pole 220. The leading shield 206 may provide electromagnetic shielding and is separated from the main pole 220 by a leading gap 254.

Figure 3A:
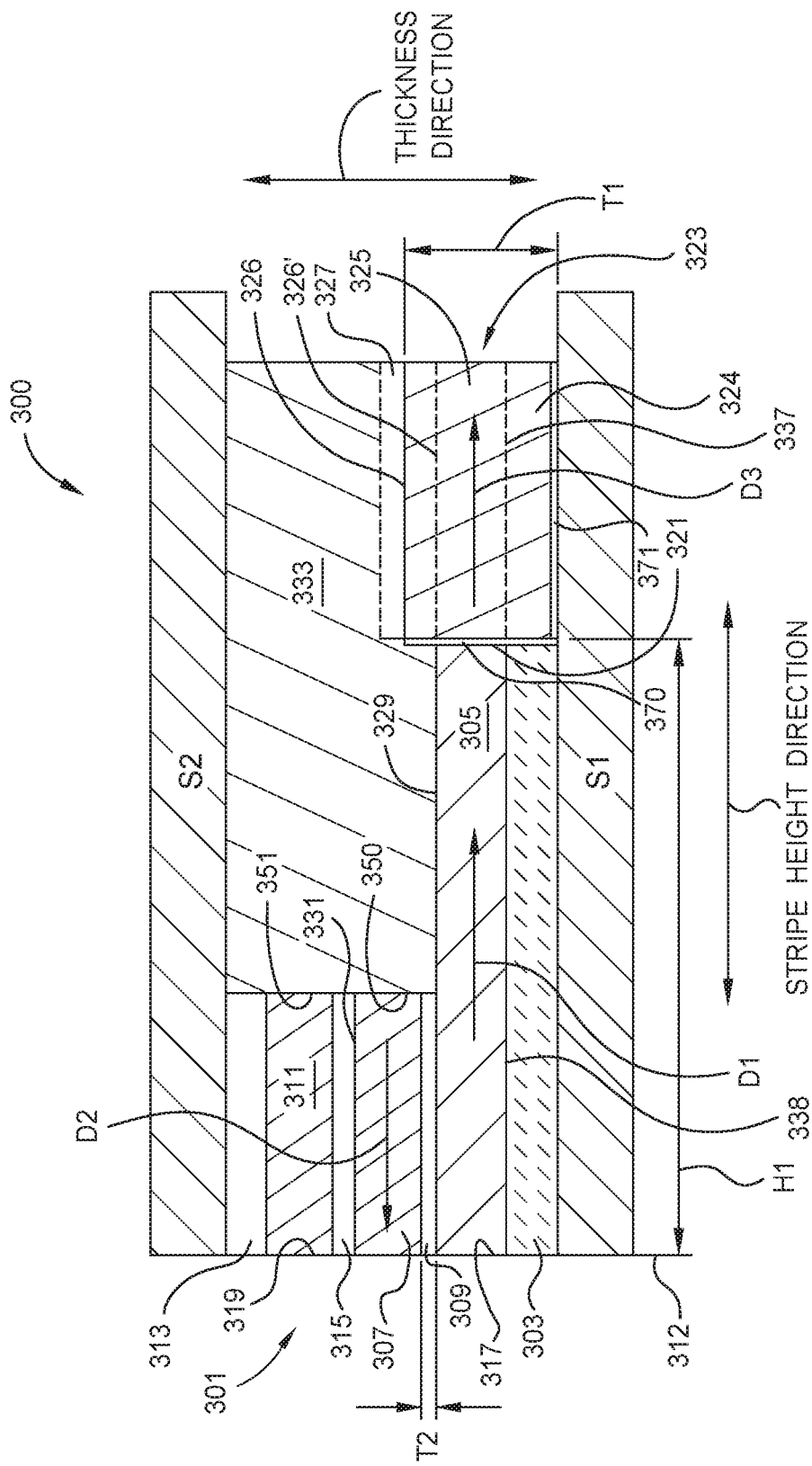
FIG. 3A is a schematic illustration of a side view of a magnetic read head, according to one implementation.

FIG. 3A is a schematic illustration of a side view of a magnetic read head 300, according to one implementation, and may be used as the magnetic read head 211 shown in FIG. 2. The side view shown is a throat view, or an APEX view, of the magnetic read head 300. The magnetic read head 300 includes a magnetic sensor 301 sandwiched between a lower shield S1 and an upper shield S2. The magnetic sensor 301 includes a seed layer 303 formed on and above the lower shield S1, and a first pinning layer 305 formed on and above the seed layer 303. A second pinning layer 307 is formed above the first pinning layer 305, and a spacer layer 309 is formed between the first pinning layer 305 and the second pinning layer 307. A free layer 311 is formed above the second pinning layer 307, and a barrier layer 315 is formed between the free layer 311 and the second pinning layer 307. A cap layer 313 is formed between the free layer 311 and the upper shield S2. The upper shield S2 is formed above the free layer 311 and above the cap layer 313.

In FIG. 3A, cross-sectional hatching for the cap layer 313, the barrier layer 315, and the spacer layer 309 is omitted for ease of visual reference.

The magnetic read head 300 includes a media facing surface (MFS) 312 such as an air bearing surface (ABS). Inward ends of each of the seed layer 303, the first pinning layer 305, the spacer layer 309, the second pinning layer 307, the barrier layer 315, the free layer 311, and the cap layer 313 are disposed at the MFS 312. As an example, an inward end 317 of the first pinning layer 305 is disposed at the MFS 312, and an inward end 319 of the free layer is disposed at the MFS 312. An outward end 321 of the first pinning layer 305 is disposed outwardly of an outward end 350 of the second pinning layer 307 relative to the MFS 312. The outward end 321 of the first pinning layer 305 is also disposed outwardly of an outward end 351 of the free layer 311. The outward end 350 of the second pinning layer 307 and the outward end 351 of the free layer 311 are disposed inwardly of the outward end 321 of the first pinning layer 305 relative to the MFS 312.

The seed layer 303 is formed of a material that includes one or more of Ta, W (tungsten), Ru, Cr, Co, Ti, and/or Hf. Each of the first pinning layer 305 and the second pinning layer 307 is magnetic and is formed of a material that includes one or more of Co, Fe, B, Ni, and/or an alloy thereof. In one example, the first pinning layer 305 and/or the second pinning layer 307 include an alloy, such as CoFe or NiFe. The spacer layer 309 is nonmagnetic and is formed of a metal material. In one embodiment, which can be combined with other embodiments, the metal material of the spacer layer 309 is Ru. The spacer layer 309 is of a thickness T2. The thickness T2 is within a range of 4 Å to 9 Å. In one example, the thickness T2 is within a range of 4 Å to 5 Å or within a range of 8 Å to 9 Å. The spacer layer 309 facilitates the magnetizations of the first and second pinning layers 305, 307 being anti-parallel to each other. In one example, the spacer layer 309 facilitates an RKKY interaction between the first and second pinning layers 305, 307. The barrier layer 512 is nonmagnetic and includes MgO, aluminum oxide (AlxOx) such as Al2O3, or any other suitable insulation material. The cap layer 313 includes one or more of W, Ta, Ru, Cr, Ti, Hf, and/or any other suitable cap material. The free layer 311 is formed of a material that includes one or more of Ni, Fe, Co, B, and/or Hf.

The magnetic read head 300 includes a rear hard bias (RHB) 323 disposed outwardly of the first pinning layer 305 relative to the MFS 312. In one embodiment, which can be combined with other embodiments, the RHB 323 includes a seed layer 324 (shown in ghost), a magnetic layer 325 formed on the seed layer 324, and a nonmagnetic cap layer 327 (shown in ghost) formed on the magnetic layer 325. The seed layer 324 may be similar to or different from the seed layer 303 between the first pinning layer 305 and the lower shield S1, and may include one or more aspects, features, components, and/or properties of the seed layer 303. An upper end 326 of the RHB 323 is aligned with (shown in ghost as 326' in FIG. 3A) or above (as shown in FIG. 3A) an upper end 329 of the first pinning layer 305 along the thickness direction. In one example, the upper end 326 of the RHB 323 is exclusive of the nonmagnetic cap layer 327 such that the upper end 326 of the RHB 323 is the upper end of the magnetic layer 325. A lower end 337 of the magnetic layer 325 is aligned with or below a lower end 338 of the first pinning layer 305. A lower end of the RHB 323, such as the lower end 337 of the magnetic layer 325 or a lower end of the seed layer 324, may be aligned with or below a lower end of the seed layer 303. A lower end of the RHB 323, such as the lower end 337 of the magnetic layer 325 or the lower end of the seed layer 324, may extend into the lower shield S1. The upper end 326 of the RHB 323 is below an upper end 331 of the second pinning layer 307 along the thickness direction. The present disclosure contemplates that the upper end 326 of the RHB 323 may be aligned with or above the upper end 331 of the second pinning layer 307. The upper end 326 of the RHB 323 may be aligned with or above an upper end of the spacer layer 309. The magnetic sensor 301 of the magnetic read head 300 also includes an insulation material 333 formed above the RHB 323, above an outward portion of the first pinning layer 305. The insulation material 333 is also formed outwardly of the spacer layer 309, the second pinning layer 307, the barrier layer 315, the free layer 311, and the cap layer 313. The magnetic read head 300 also includes an insulation layer 370 formed between the RHB 323 and the first pinning layer 305, between the RHB 323 and the second pinning layer 307, between the RHB 323 and the spacer layer 309, and between the RHB 323 and the seed layer 303. The magnetic read head 300 also includes an insulation layer 371 formed between the RHB 323 and the lower shield S1. The RHB 323 is separated from the first pinning layer 305 using the insulation layer 370. In FIG. 3A, cross-sectional hatching for the insulation layer 370 and the insulation layer 371 is omitted for ease of visual reference.

The magnetic layer 325 of the RHB 323 is formed of a material having a high coercivity, such as a material that includes one or more of Co, Pt and/or Cr, such as CoPt or CoPtCr. The insulation material 333 is formed of a material including MgO, aluminum oxide ($Al_xO_x$), silicon oxide ($Si_xO_x$), silicon nitride ($Si_xN_x$), or any other suitable insulation material. The RHB 323 is of a thickness T1 that is 50 nm or less, such as 20 nm.

The layers 303, 305, 307, 309, 311, 313, and 315 are formed on the lower shield S1 using a deposition process such as physical vapor deposition (PVD) sputtering, ion beam deposition (IBD), electroplated deposition, atomic layer deposition (ALD), or chemical vapor deposition (CVD). The layers of the magnetic sensor 301 are milled (such as by using ion milling) or etched to form openings for the RHB 323 and the insulation material 333. The openings are then refilled with the insulation layer 370, the insulation layer 371, the RHB 323 and the insulation material 333 using one or more deposition processes. In one example, a full mill is conducted in the track width direction that extends fully from one side of the layers to an opposite side of the layers in the track width direction; a partial mill is conducted in the thickness direction that stops at or above the upper end 329 of the first pinning layer 305; and a full mill is conducted in the thickness direction outward of the first pinning layer 305 that stops at or into the lower shield S1

The magnetizations of the first pinning layer 305 and the second pinning layer 307 are oriented in an antiparallel orientation with respect to each other. The first pinning layer 305 is magnetically oriented in a first direction D1. The first pinning layer 305 is magnetically oriented such that a magnetization of the first pinning layer 305 is aligned with the first direction D1. The first direction D1 points outwardly and away from the MFS 312, is perpendicular to the MFS 312, and is parallel to the stripe height direction. The second pinning layer 307 is magnetically oriented in a second direction D2 that is opposite of the first direction D1. The second pinning layer 307 is magnetically oriented such that a magnetization of the second pinning layer 307 is aligned with the second direction D2. The magnetic layer 325 of the RHB 323 is oriented to generate a magnetic field in a bias direction D3. The bias direction D3 points in the same direction as the first direction D1 along the stripe height direction. The first direction D1 points outwardly and away from the MFS 312. The second direction D2 points inwardly and toward the MFS 312. The bias direction D3 points outwardly, away from the MFS 312, and away from the first pinning layer 305.

The magnetic field in the bias direction D3 applies magnetic force to the first pinning layer 305 and stabilizes the magnetization of the first pinning layer 305. Due to antiparallel coupling between the first and second pinning layers 305, 307 facilitated using the spacer layer 309 that includes the thickness T2, the magnetization in the second direction D2 will be oriented 180 degrees relative to the magnetization of the first pinning layer 305 in the first direction D1. The magnetizations are also maintained substantially in the first and second directions D1, D2. The RHB 323 applies magnetic force to the first pinning layer 305 that is larger than any magnetic force—if any—applied to the second pinning layer 307 by the RHB 323. Large shape anisotropy (due to a long height H1 described below) and transverse Hk induced along the stripe height direction (due to compressive stress and positive magnetostrictive properties of the first and second pinning layers 305, 307) on the first and second pinning layers 305, 307 further stabilize the magnetizations of the first and second pinning layers 305, 307.

The present disclosure contemplates that the first direction D1, the second direction D2, and the bias direction D3 may be reversed such that the second direction D2 points outwardly, and the first direction D1 and the bias direction D3 point inwardly.

The first pinning layer 305 includes a height H1 in the stripe height direction. The height H1 is larger than respective heights of the spacer layer 309, the second pinning layer 307, the barrier layer 315, the free layer 311, and the cap layer 313. The height H1 is 100 nm or less, such as within a range of 30 nm to 90 nm. In one example, the height H1 is at least double a height of the second pinning layer 307. In one embodiment, which can be combined with other embodiments, the height H1 of the first pinning layer 305 may be approximately equal to the respective heights of the spacer layer 309, the second pinning layer 307, the barrier layer 315, the free layer 311, and the cap layer 313. In such an embodiment, a height of the RHB 323 in the stripe height direction may be larger than in the implementation shown in FIG. 3A, and is about equal to a height of the insulation material 333 in the stripe height direction. In such an embodiment, the upper end 326 of the RHB 323 is aligned with or below the upper end 329 of the first pinning layer 305. In one example, the upper end 326 of the RHB 323 is exclusive of the nonmagnetic cap layer 327 such that the upper end 326 of the RHB 323 is the upper end of the magnetic layer 325. In such an embodiment, a height of the seed layer 303 may be lesser than in the implementation shown in FIG. 3A, and is approximately equal to the height H1 of the first pinning layer 305 and approximately equal to the respective heights of the spacer layer 309, the second pinning layer 307, the barrier layer 315, the free layer 311, and the cap layer 313. In the implementation shown in FIG. 3A, the height of the RHB 323 is lesser than the height of the insulation material 333.

Figure 3B:
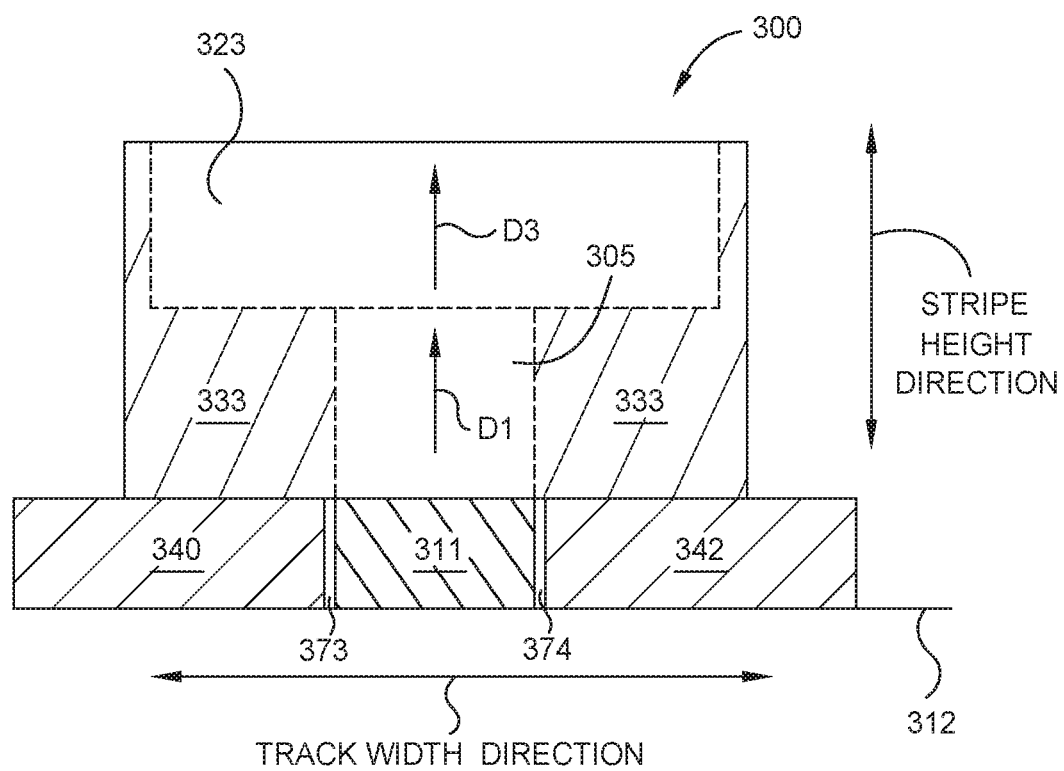
FIG. 3B is a schematic illustration of a top view of the magnetic read head shown in FIG. 3A, according to one implementation.

FIG. 3B is a schematic illustration of a top view of the magnetic read head 300 shown in FIG. 3A, according to one implementation. The upper shield S2 and the cap layer 313 are omitted in FIG. 3B. The magnetic read head 300 includes a soft bias (SB) or hard bias (HB) material on both sides of the first pinning layer 305, second pinning layer 307 and the free layer 311 in the track width direction. The SB on both sides are in the form of a first soft bias (or first side shield) 340 on a first side of the layers 305, 307, 311 and a second soft bias (or second side shield) 342 on a second side of the layers 305, 307, 311. The insulation material 333 is formed on both sides of the RHB 323 and the first pinning layer 305 in the track width direction. The magnetic read head 300 also includes an insulation layer 373 and an insulation layer 374 disposed on both sides of the layers 305, 307, 311. The insulation layer 373 is disposed between the layers 305, 307, 311 and the first side shield 340, and separates the layers 305, 307, 311 from the first side shield 340. The insulation layer 374 is disposed between the layers 305, 307, 311 and the second side shield 342, and separates the layers 305, 307, 311 from the second side shield 342.

Figure 3C:
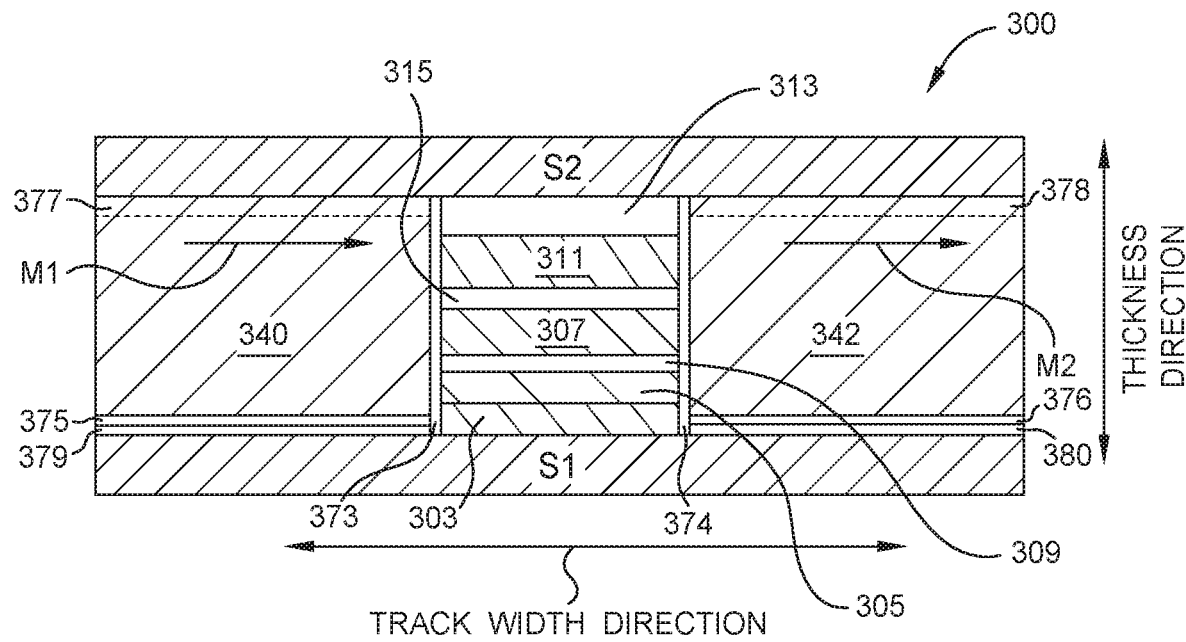
FIG. 3C is a schematic illustration of a front view of the magnetic read head shown in FIG. 3A, according to one implementation.

FIG. 3C is a schematic illustration of a front view of the magnetic read head 300 shown in FIG. 3A, according to one implementation. The front view is an MFS view, such as an ABS view. The first side shield 340 and the second side shield 342 are both oriented to generate magnetic fields M1, M2 in the same direction along the track width direction. Each of the first side shield 340 and the second side shield 342 includes a single material layer structure (as shown in FIG. 3C) disposed between the upper shield S2 and the lower shield S1. Insulation layers 379, 380 are formed respectively between seed layers 375, 376 and the lower shield S1. In one embodiment, which can be combined with other embodiments, the first side shield 340 and the second side shield 342 are coupled directly to the upper shield S2 and separated from the lower shield S1 through layers, such as insulation layers 373, 374, insulation layers 379, 380, and/or seed layers 375, 376. The first side shield 340 and the second side shield 342 are de-coupled from the lower shield S1 using the insulation layers 373, 374, insulation layers 379, 380, and/or seed layers 375, 376. The insulation layers 379, 380 and the insulation layers 373, 374 insulate the respective first and second side shields 340, 342 from the lower shield S1. In one example, a soft bias (SB) material is used for the first and second side shields 340, 342. In one embodiment, which can be combined with other embodiments, each of the first and second side shields 340, 342 includes a hard bias (HB) material, and each of the first and second side shields 340, 342 are insulated from both the lower shield S1 (using insulation layers 373, 374) and the upper shield S2 (using cap layers 377, 378, which are shown in ghost). The single material layer structure of each of the first and second side shields 340, 342 is formed of a single material. The single material layer structure may include a single layer formed of a single material, or a plurality of layers that are formed of the single material and are magnetically coupled directly together. In one embodiment, which can be combined with other embodiments, the single material includes a soft bias (SB) material that is a soft magnetic material. In one example, the single material includes one or more of Ni, Fe, Co, or Cr, Pt, Hf, and/or an alloy thereof. The first and second side shields 340, 342 facilitate reduced complexities relative to configurations, such as dual free layer reader configurations, where a synthetic anti-ferromagnetic layer (SAF) soft bias shield is aligned with the barrier layer 315. The first and second side shields 340, 342 also facilitate use of a larger RHB 323. In FIG. 3C, cross-sectional hatching for the seed layers 375, 376, the insulation layers 379, 380, and the insulation layers 373, 374 is omitted for ease of visual reference.

In FIG. 3C, cross-sectional hatching for the cap layer 313, the barrier layer 315, and the spacer layer 309 is omitted for ease of visual reference.

Figure 4A:
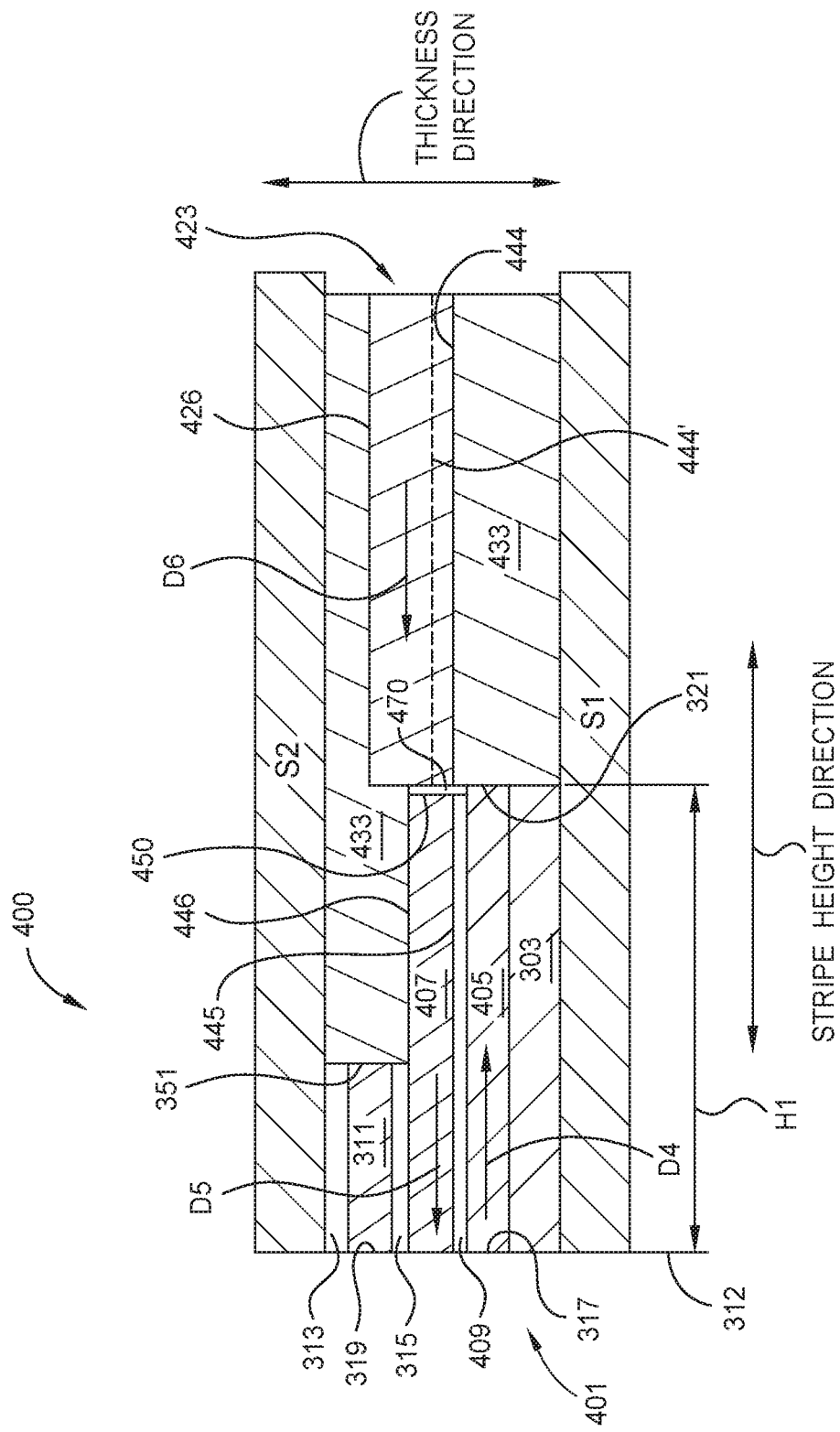
FIG. 4A is a schematic illustration of a side view of a magnetic read head, according to one implementation.

FIG. 4A is a schematic illustration of a side view of a magnetic read head 400, according to one implementation, and may be used as the magnetic read head 211 shown in FIG. 2. The side view shown is a throat view, or an APEX view, of the magnetic read head 400. The magnetic read head 400 is similar to the magnetic read head 300 illustrated in FIG. 3A, and includes one or more of the aspects, features, components/and/or properties thereof. The magnetic read head 400 is a read head, and may be used as the magnetic read head 211 shown in FIG. 2. The magnetic read head 400 includes a magnetic sensor 401 sandwiched between the lower shield S1 and the upper shield S2. The magnetic sensor 401 is similar to the magnetic sensor 301 illustrated in FIG. 3A, and includes one or more of the aspects, features, components/and/or properties thereof.

The magnetic sensor 401 includes a first pinning layer 405 that is similar to the first pinning layer 305 shown in FIG. 3A, but is magnetically oriented in a first direction D4 that points outwardly and away from the MFS 312. A magnetization of the first pinning layer 305 is in the first direction D4. The magnetic sensor 401 includes a spacer layer 409 that is similar to the spacer layer 309 shown in FIG. 3A, but includes a height approximately equal to the height H1 of the first pinning layer 405. The spacer layer 409 also includes an outward end aligned with the outward end 321 of the first pinning layer 405. The magnetic sensor 401 includes a second pinning layer 407 that is similar to the second pinning layer 407 shown in FIG. 3A, but is magnetically oriented in a second direction D5 that points inwardly and toward the MFS 312. A magnetization of the second pinning layer 407 is in the second direction D5. The second pinning layer 407 also includes a height that is approximately equal to the height H1 of the first pinning layer 405. The second pinning layer 407 also includes an outward end 450. The outward end 450 is disposed inwardly of the outward end 321 of the first pinning layer 405 (as shown in FIG. 4A) or is aligned with the outward end 321 of the first pinning layer 405.

In FIG. 4A, cross-sectional hatching for the cap layer 313, the barrier layer 315, and the spacer layer 409 is omitted for ease of visual reference.

The magnetic read head 400 includes a rear hard bias (RHB) 423 that is similar to the RHB 323 shown in FIG. 3A, but is oriented to generate a magnetic field in a bias direction D6 that points in the same direction as the second direction D5 of the second pinning layer 407. The bias direction D6 points inwardly and toward the second pinning layer 407. A lower end 444 of the RHB 423 is aligned with (as shown in FIG. 4A) or above (as shown in ghost as 444' in FIG. 4A) a lower end 445 of the second pinning layer 407. In one embodiment, which can be combined with other embodiments, the lower end 444 of the RHB 423 is exclusive of a seed layer of the RHB 423 such that the lower end 444 is a lower end of a magnetic layer of the RHB 423. In such an embodiment, the RHB 423 may include the seed layer on which the magnetic layer of the RHB 423 is formed. The lower end 444 of the RHB 423 is below an upper end 446 of the second pinning layer 407. An upper end 426 of the RHB 423 is above the upper end 446 of the second pinning layer 407. In one example, the upper end 426 of the RHB 423 is exclusive of a nonmagnetic cap layer of the RHB 423 such that the upper end 426 of the RHB 423 is the upper end of a magnetic layer of the RHB 423. In such an embodiment, the RHB 423 may include the nonmagnetic cap layer formed on the magnetic layer of the RHB 423. The magnetic read head 400 includes an insulation layer 470 between the second pinning layer 407 and the RHB 423 that separates the RHB 423 from the second pinning layer 407. The insulation layer 470 also separates the RHB 423 from the spacer layer 409.

The layers 303, 405, 407, 409, 311, 313, and 315 are formed on the lower shield S1 using a deposition process such as physical vapor deposition (PVD) sputtering, ion beam deposition (IBD), electroplated deposition, atomic layer deposition (ALD), or chemical vapor deposition (CVD). The layers of the magnetic sensor 401 are milled (such as by using ion milling) or etched to form openings for the insulation layer 470, the RHB 423, and the insulation material 433. The openings are then refilled with the insulation layer 470, the RHB 423 and the insulation material 433 using one or more deposition processes. The insulation layer 470 is deposited prior to the RHB 423 and the insulation material 433 to electrically isolate the RHB 423 from the second pinning layer 407 and the spacer layer 409. The insulation material 433 includes a first portion disposed below the RHB 423 and a second portion disposed above the RHB 423. The first portion of the insulation material 433 and the second portion of the insulation material 433 may be deposited separately. The insulation layer 470 is in contact with the first portion of the insulation material 433 and the second portion of the insulation material 433. In one example, a full mill is conducted in the track width direction that extends fully from one side of the layers to an opposite side of the layers in the track width direction; and a partial mill is conducted in the thickness direction that stops at the upper end 446 of the second pinning layer 407.

The magnetic field in the bias direction D6 applies magnetic force to the second pinning layer 407 and stabilizes the magnetization of the second pinning layer 407. Anti-parallel coupling between the first and second pinning layers 405 and 407 using the spacer layer 409 also facilitates maintaining the magnetization of the second pinning layer 407 in the second direction D5 at substantially 180 degrees relative to the magnetization in the first direction D4 of the first pinning layer 405. The magnetizations of the first and second pinning layers 405, 407 are also maintained substantially in the respective first and second directions D4, D5. The RHB 423 applies magnetic force to the second pinning layer 407 that is larger than any magnetic force—if any—applied to the first pinning layer 405 by the RHB 423. Large shape anisotropy due to long heights (in the stripe height direction) of the first and second pinning layers 405, 407 and transverse Hk induced along the stripe height direction (due to compressive stress and positive magnetostrictive properties of the first and second pinning layers 405, 407) on the first and second pinning layers 405, 407, further stabilize the magnetizations of the first and second pinning layers 405, 407.

The present disclosure contemplates that the first direction D4, the second direction D5, and the bias direction D6 may be reversed such that the first direction D4 points inwardly, and the second direction D5 and the bias direction D6 point outwardly.

The magnetic read head 400 includes an insulation material 433 that is similar to the insulation material 33 shown in FIG. 3A, but is formed above the RHB 423, below the RHB 423, and outwardly of the barrier layer 315, the free layer 311, and the cap layer 313. The insulation material 433 is also formed above an outward portion of the second pinning layer 407, an outward portion of the spacer layer 409, and an outward portion of the first pinning layer 405. The insulation material 433 is also formed outwardly of the spacer layer 409, the first pinning layer 405, and the seed layer 303.

Figure 4B:
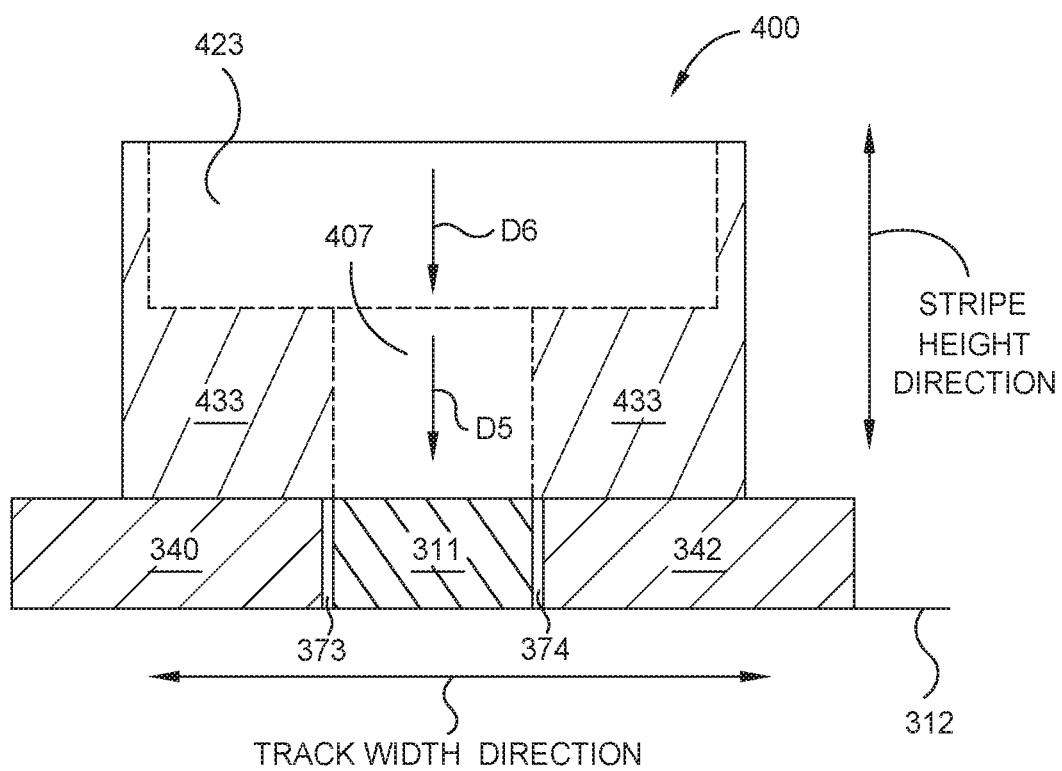
FIG. 4B is a schematic illustration of a top view of the magnetic read head shown in FIG. 4A, according to one implementation.

FIG. 4B is a schematic illustration of a top view of the magnetic read head 400 shown in FIG. 4A, according to one implementation. The upper shield S2 and the cap layer 313 are omitted in FIG. 4B. The magnetic read head 400 includes the soft bias (SB) on both sides of the first pinning layer 405, the second pinning layer 407 and the free layer 311 in the track width direction. The SB on both sides are in the form of the first side shield 340 on a first side of the layers 405, 407, 311 and the second side shield 342 on a second side of the layers 405, 407, 311. The insulation material 433 is formed on both sides of the RHB 423, the first pinning layer 405, and the second pinning layer 407 in the track width direction. The magnetic read head 400 also includes the insulation layer 373 and the insulation layer 374 disposed on both sides of the layers 405. The insulation layer 373 is disposed between the layers 405, 407, 311 and the first side shield 340, and separates the layers 405, 407, 311 from the first side shield 340. The insulation layer 374 is disposed between the layers 405, 407, 311 and the second side shield 342, and separates the layers 405, 407, 311 from the second side shield 342.

Figure 4C:
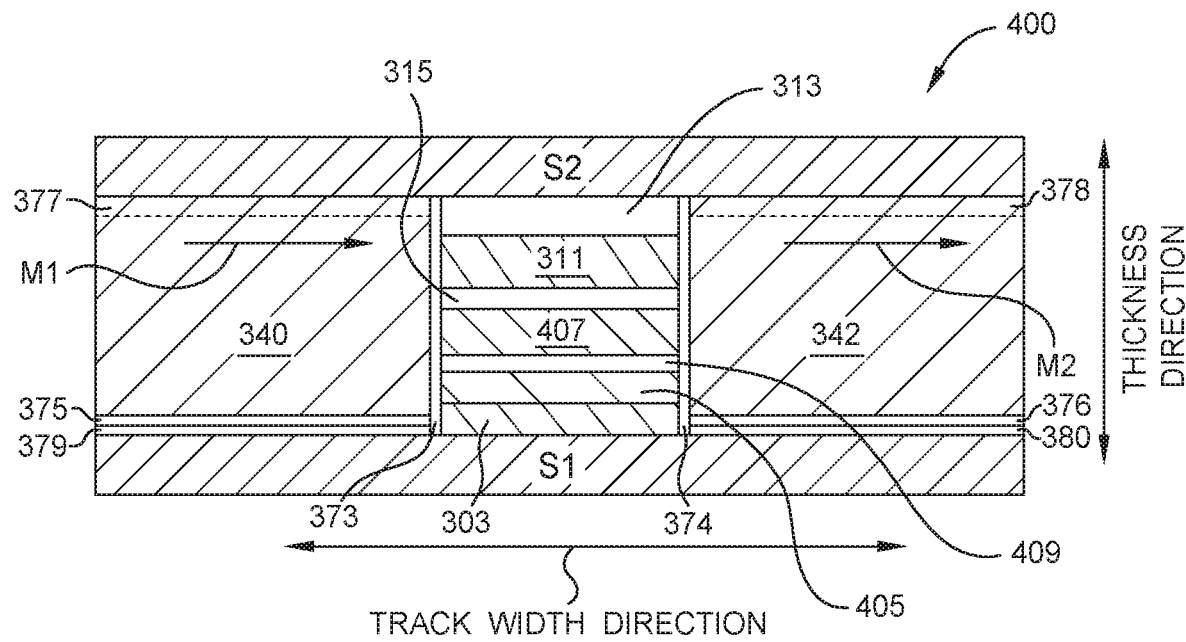
FIG. 4C is a schematic illustration of a front view of the magnetic read head shown in FIG. 4A, according to one implementation.

FIG. 4C is a schematic illustration of a front view of the magnetic read head 400 shown in FIG. 4A, according to one implementation. The front view is an MFS view, such as an ABS view.

In FIG. 4C, cross-sectional hatching for the cap layer 313, the barrier layer 315, and the spacer layer 409 is omitted for ease of visual reference.

Figure 5A:
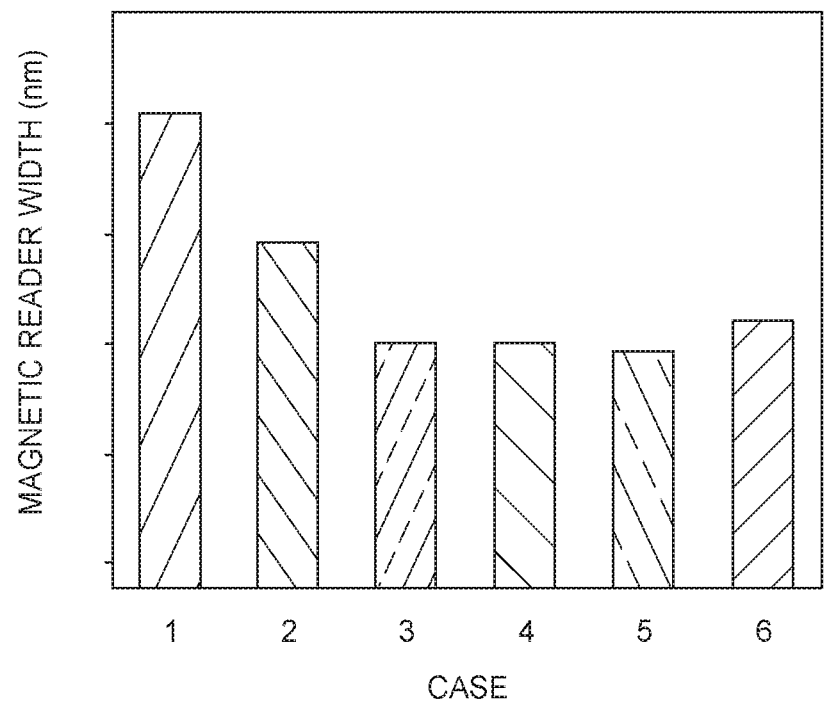
FIG. 5A is a schematic graphical illustration of magnetic reader widths of multiple cases of magnetic recording heads, according to various implementations.
Figure 5B:
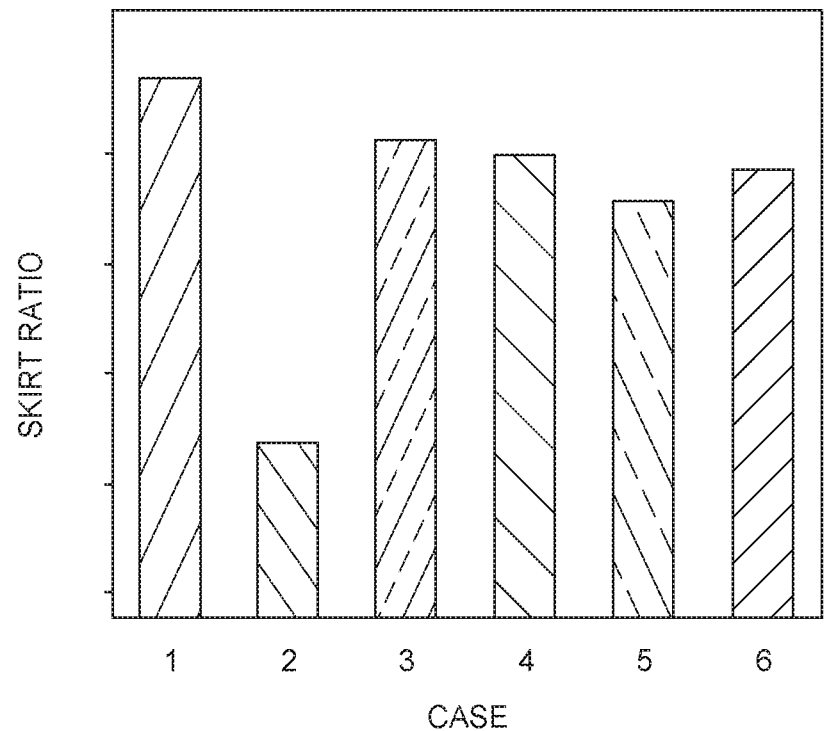
FIG. 5B is a schematic graphical illustration of skirt ratios of multiple cases of magnetic read heads, according to various implementations.
Figure 5C:
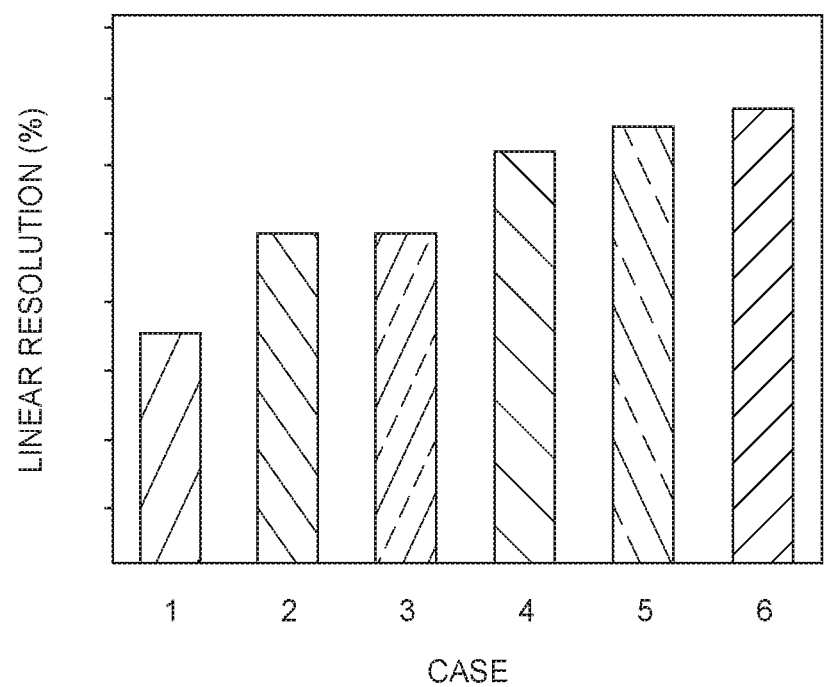
FIG. 5C is a schematic graphical illustration of linear resolutions of multiple cases of magnetic read heads, according to various implementations.

FIG. 5A is a schematic graphical illustration of magnetic reader widths of multiple cases of magnetic read heads with the same physical track width of 25 nm, according to various implementations. The magnetic reader widths are mapped as nm. FIG. 5B is a schematic graphical illustration of skirt ratios of multiple cases of magnetic read heads, according to various implementations. For the graph shown in FIG. 5B, skirt ratio is defined as a ratio of magnetic width at 10% amplitude to that of 50% amplitude from microtrack profile. FIG. 5C is a schematic graphical illustration of linear resolutions of multiple cases of magnetic read heads, according to various implementations. The linear resolutions are mapped as percentages.

Case 1 represents using a conventional magnetic sensor with an AFM layer included in a film stack with a read gap of 25 nm. Case 2 represents using a magnetic sensor with two free layers (which may be referred to as a dual free layer, or DFL, configuration) with a read gap of 20 nm. Case 3 represents using a magnetic sensor with an AFM layer recessed from an MFS with a read gap seen from the MFS side of 20 nm.

Case 4 represents using the magnetic read head 400 shown in the implementations of FIGS. 4A-4C. Case 5 represents using the magnetic read head 300 shown in the implementations of FIGS. 3A-3C, where the height H1 of the first pinning layer 305 is about 30 nm. Case 6 represents using the magnetic read head 300 shown in the implementations of FIGS. 3A-3C, where the height H1 of the first pinning layer 305 is about 90 nm. In all cases, heights in the stripe height direction of the free layer and pinning layers are 30 nm unless specified otherwise.

As shown in FIGS. 5A-5C, Cases 4-6 using aspects disclosed herein involve benefits such as reduced magnetic reader widths, reduced skirt ratios, and/or increased linear resolutions relative to Cases 1-3. In FIG. 5A, Case 5 has a lesser magnetic reader width than Cases 1-3, and Cases 4 and 6 have lesser magnetic reader widths than Cases 1 and 2. In FIG. 5B, Cases 4-6 have lesser skirt ratios than Cases 1 and 3. In FIG. 5C, Cases 4-6 have greater linear resolutions than Cases 1-3. Hence, aspects disclosed herein can facilitate increased resolution and reduced skirt ratio while maintaining or reducing magnetic reader width with thinner reader gaps, without specialized stitching processes or separate deposition for AFM layers in Case 3. Such aspects facilitate increased areal density capability (ADC). In Cases 4-6, a read gap of 20 nm is used.

Benefits of the present disclosure include reduced magnetic reader widths, smaller skirt ratios in the track width direction while increasing resolutions, simpler deposition and formation processes, eliminated use of specialized stitching and separate deposition of AFM layers, using single free layers with no AFM layers, reduced reader gaps, reduced skirt ratios, increased ADC, stabilized pinning layers, reduced complexities relative to configurations where SAF side shields are in need of alignment with barrier layers, independent control of RHB and side shields, and increased cross track squeeze capability.

It is contemplated that one or more aspects disclosed herein may be combined. As an example, aspects of the magnetic sensor 401 may be combined with aspects of the magnetic sensor 301. Moreover, it is contemplated that one or more aspects disclosed herein may include some or all of the aforementioned benefits.

In one embodiment, a magnetic read sensor comprises a media facing surface and a first pinning layer magnetically oriented in a first direction. The first pinning layer includes an inward end at the media facing surface and an outward end. A second pinning layer is formed above the first pinning layer and magnetically oriented in a second direction that is opposite of the first direction. The second pinning layer includes an inward end at the media facing surface and an outward end. A spacer layer is between the first pinning layer and the second pinning layer. A free layer is formed above the second pinning layer, and the free layer includes an inward end disposed at the media facing surface and an outward end. A barrier layer is between the second pinning layer and the free layer. A rear hard bias is disposed outwardly of the first pinning layer relative to the media facing surface. The rear hard bias is magnetically oriented to generate a magnetic field in a bias direction that points in the same direction as the first direction of the first pinning layer. The rear hard bias includes a seed layer, a magnetic layer on the seed layer, and a nonmagnetic cap layer on the magnetic layer. An upper end of the rear hard bias is aligned with or above an upper end of the first pinning layer. The upper end of the rear hard bias is below an upper end of the second pinning layer. The outward end of the second pinning layer and the outward end of the free layer are disposed inwardly of the outward end of the first pinning layer, and the magnetic read sensor includes an insulation material formed above the rear hard bias and outwardly of the free layer and the second pinning layer. The magnetic read sensor also includes an insulation layer formed between the rear hard bias and the first pinning layer. A magnetic layer of the rear hard bias is formed of a material including one or more of Co, Pt, or Cr. The magnetic read sensor also includes a lower shield below the first pinning layer, an upper shield above the free layer, and a cap layer between the free layer and the upper shield. The spacer layer includes Ru and the barrier layer includes MgO or Al2O3. A magnetic recording device including the magnetic read sensor is also disclosed.

In one embodiment, a magnetic read sensor comprises a media facing surface, and a first pinning layer magnetically oriented a first direction. The first pinning layer includes an inward end at the media facing surface and an outward end. A second pinning layer is formed above the first pinning layer and magnetically oriented in a second direction that is opposite of the first direction. The second pinning layer includes an inward end at the media facing surface and an outward end. A spacer layer is between the first pinning layer and the second pinning layer. A free layer formed above the second pinning layer, and the free layer includes an inward end disposed at the media facing surface and an outward end. A barrier layer is between the second pinning layer and the free layer. A rear hard bias is disposed outwardly of the second pinning layer relative to the media facing surface, and the rear hard bias is magnetically oriented to generate a magnetic field in a bias direction. The bias direction points in the same direction as the second direction of the second pinning layer. A lower end of the rear hard bias is aligned with or above a lower end of the second pinning layer. The upper end of the rear hard bias is above an upper end of the second pinning layer. The outward end of the free layer is disposed inwardly of the outward end of the second pinning layer and inwardly of the outward end of the first pinning layer. The magnetic read sensor also includes an insulation material formed above the rear hard bias, below the rear hard bias, and outwardly of the free layer, and an insulation layer formed between the rear hard bias and the second pinning layer. The insulation material is formed above a portion of the second pinning layer and above a portion of the first pinning layer. A magnetic layer of the rear hard bias is formed of a material including one or more of Co, Pt, or Cr. A magnetic recording device including the magnetic read sensor is also disclosed.

In one embodiment, a magnetic read sensor comprises a media facing surface, a lower shield, and a first pinning layer formed above the lower shield and magnetically oriented in a first direction. The first pinning layer includes an inward end at the media facing surface and an outward end. The magnetic read sensor also includes a second pinning layer formed above the first pinning layer and magnetically oriented n a second direction that is opposite of the first direction. The second pinning layer includes an inward end at the media facing surface and an outward end. The magnetic read sensor also includes a free layer formed above the second pinning layer, and the free layer includes an inward end disposed at the media facing surface and an outward end. The magnetic read sensor also includes an upper shield formed above the free layer, and a first side shield formed on a first side of the first pinning layer, the second pinning layer, and the free layer. The first side shield includes a single material layer structure coupled to the upper shield and separated from the lower shield through an insulation layer. The magnetic read sensor also includes a second side shield formed on a second side of the first pinning layer, the second pinning layer, and the free layer. The second side shield includes a single material layer structure coupled to the upper shield and separated from the lower shield through an insulation layer. The outward end of the first pinning layer is disposed outwardly of the outward end of the second pinning layer and outwardly of the outward end of the free layer. A magnetic recording device including the magnetic read sensor is also disclosed.

While the foregoing is directed to embodiments of the present disclosure, other and further embodiments of the disclosure may be devised without departing from the basic scope thereof, and the scope thereof is determined by the claims that follow.

What is claimed is:

1. A magnetic sensor, comprising:
   a first pinning layer magnetically oriented in a first direction, the first pinning layer comprising a lower end, an upper end opposite the lower end, an inward end at a media facing surface, and an outward end;
   a second pinning layer formed above the first pinning layer and magnetically oriented in a second direction that is opposite of the first direction, the second pinning layer comprising a lower end, an upper end opposite the lower end, an inward end at the media facing surface, and an outward end;
   a spacer layer between the first pinning layer and the second pinning layer;
   a free layer formed above the second pinning layer, the free layer comprising an inward end disposed at the media facing surface, and an outward end;
   a barrier layer between the second pinning layer and the free layer; and
   a rear hard bias disposed outwardly of the first pinning layer relative to the media facing surface, the rear hard bias being magnetically oriented to generate a magnetic field in a bias direction that points in the same direction as the first direction of the first pinning layer, wherein the rear hard bias comprises one or more layers, a first layer of the one or more layers having a lower end aligned with the lower end of the first pinning layer, and wherein an upper end of the rear hard bias is aligned with the upper end of the first pinning layer or disposed below the upper end of the second pinning layer.

2. The magnetic sensor of claim 1, wherein a second layer of the one or more layers of the rear hard bias is a seed layer and the first layer of the one or more layers is a magnetic layer disposed on the seed layer.

3. The magnetic sensor of claim 1, wherein the first layer of the one or more layers is a magnetic layer formed of a material including one or more of Co, Pt, or Cr.

4. The magnetic sensor of claim 1, further comprising a lower shield below the first pinning layer, an upper shield above the free layer, and a cap layer between the free layer and the upper shield.

5. The magnetic sensor of claim 1, wherein the spacer layer comprises Ru and the barrier layer comprises MgO or $Al_2O_3$.

6. A magnetic recording head comprising the magnetic sensor of claim 1.

7. The magnetic sensor of claim 1, wherein the first layer of the one or more layers of the rear hard bias is a magnetic layer.

8. The magnetic sensor of claim 1, wherein a stripe height of the first pinning layer extending from a media facing surface into the magnetic sensor is greater than a stripe height of the second pinning layer.

9. The magnetic sensor of claim 1, wherein a stripe height of the first pinning layer extending from a media facing surface into the magnetic sensor is about double a stripe height of the second pinning layer.

10. A magnetic sensor, comprising:
    a first pinning layer magnetically oriented in a first direction, the first pinning layer comprising an inward end at a media facing surface, and an outward end;
    a second pinning layer formed above the first pinning layer and magnetically oriented in a second direction that is opposite of the first direction, the second pinning layer comprising an inward end at the media facing surface, and an outward end;
    a spacer layer between the first pinning layer and the second pinning layer;
    a free layer formed above the second pinning layer, the free layer comprising an inward end disposed at the media facing surface, and an outward end;
    a barrier layer between the second pinning layer and the free layer; and
    a rear hard bias disposed outwardly of the first pinning layer relative to the media facing surface, the rear hard bias being magnetically oriented to generate a magnetic field in a bias direction that points in the same direction as the first direction of the first pinning layer, wherein the outward end of the second pinning layer and the outward end of the free layer are disposed inwardly of the outward end of the first pinning layer, and the magnetic sensor further comprises an insulation material formed above the rear hard bias and outwardly of the free layer and the second pinning layer, and an insulation layer formed between the rear hard bias and the first pinning layer.

11. The magnetic sensor of claim 10, wherein the rear hard bias comprises a seed layer and a magnetic layer disposed on the seed layer.

12. The magnetic sensor of claim 11, wherein the magnetic layer of the rear hard bias is formed of a material including one or more of Co, Pt, or Cr.

13. The magnetic sensor of claim 10, wherein the spacer layer comprises Ru and the barrier layer comprises MgO or $Al_2O_3$.

14. The magnetic sensor of claim 10, further comprising a lower shield below the first pinning layer, an upper shield above the free layer, and a cap layer between the free layer and the upper shield.

15. A magnetic recording head comprising the magnetic sensor of claim 10.

16. A magnetic sensor, comprising:
    a lower shield;
    a first pinning layer formed above the lower shield and magnetically oriented in a first direction, the first pinning layer comprising an inward end at a media facing surface and an outward end;
    a second pinning layer formed above the first pinning layer and magnetically oriented in a second direction that is opposite of the first direction, the second pinning layer comprising an inward end at the media facing surface and an outward end;
    a rear hard bias disposed outwardly of the first pinning layer relative to the media facing surface, the rear hard bias being magnetically oriented to generate a magnetic field in a bias direction that points in the same direction as the first direction of the first pinning layer, wherein the rear hard bias comprises one or more layers, a first layer of the one or more layers having a lower end aligned with a lower end of the first pinning layer, and wherein an upper end of the rear hard bias is aligned with an upper end of the first pinning layer or disposed below an upper end of the second pinning layer;

a free layer formed above the second pinning layer, the free layer comprising an inward end disposed at the media facing surface and an outward end, wherein the outward end of the second pinning layer and the outward end of the free layer are disposed inwardly of the outward end of the first pinning layer;

an upper shield formed above the free layer;

a first side shield formed on a first side of the first pinning layer, the second pinning layer, and the free layer, the first side shield comprising a single material layer structure coupled to the upper shield and separated from the lower shield through an insulation layer; and a second side shield formed on a second side of the first pinning layer, the second pinning layer, and the free layer, the second side shield comprising a single material layer structure coupled to the upper shield and separated from the lower shield through an insulation layer.

17. A magnetic recording head comprising the magnetic sensor of claim 16.

18. The magnetic sensor of claim 16, further comprising a first seed layer disposed between the lower shield and the first side shield and a second seed layer disposed between the lower shield and the second side shield.

19. The magnetic sensor of claim 18, further comprising a first insulating layer disposed between the first seed layer and the lower shield and a second insulating layer disposed between the second seed layer and the lower shield.

* * * * *